April 27, 1965

D. H. NORTON ETAL 3,180,053

HOLDER FOR FISH LURES

Filed Dec. 31, 1963

INVENTORS
DESMOND H. NORTON
MARTIN A. HARDIN

BY Garvey & Garvey
ATTORNEYS

3,180,053
HOLDER FOR FISH LURES
Desmond H. Norton, 1122 Patterson St., Ogden, Utah,
and Martin A. Hardin, 1790 S. 50th W., Bountiful, Utah
Filed Dec. 31, 1963, Ser. No. 334,880
6 Claims. (Cl. 43—57.5)

This is a continuation-in-part of co-pending application Serial No. 290,031, filed June 24, 1963. The present invention is a holder for fish lures and is an improvement over the Fly Holder of our U.S. Patent No. 2,693,662, issued November 9, 1954, and our Holder for Artificial Flies, as shown and described in the above referred to co-pending application.

Objects of this invention are to provide a holder for fish lures, attachable to the belt of a fisherman, which includes all the advantages of our two previous inventions, particularly the transparent casing in which the lure-holding assembly is slidable, to make the lures readily and conveniently accessible to the fisherman, but also to add improvements, which experiments have established to be desirable, these objects comprising; the provision of means included in the lure-holding entity for supporting the lures, with hooks attached, in desired vertical alignment, and spaced sufficiently to permit each lure to be grasped by the fingers, detached from its support, and removed with its hook or hooks, without contact with adjacent lures, while the holder remains attached to the belt of the fisherman; and to maintain the lure close to the entity body, even where the lure carries a plurality of hooks, attached to different parts of the lure body.

A further object of the invention is to provide a lure-supporting assembly, slidably mounted in a casing, the casing and lure-supporting assembly having complemental parts which coact to retain the assembly, in a completely accessible position, above the casing, against the resistance of yieldable means employed for retaining the assembly within the casing, at the option of the user.

Still another object of the invention is to provide a lure-supporting assembly, of novel construction, which includes corresponding slotted disks, one secured near each end of the assembly, for retaining each lure in position where it is completely visible through a transparent casing in which the assembly is mounted.

Other objects of the invention will be manifest from the following description of the present preferred form of the invention, taken in connection with the accompanying drawings, wherein.

Figure 1:
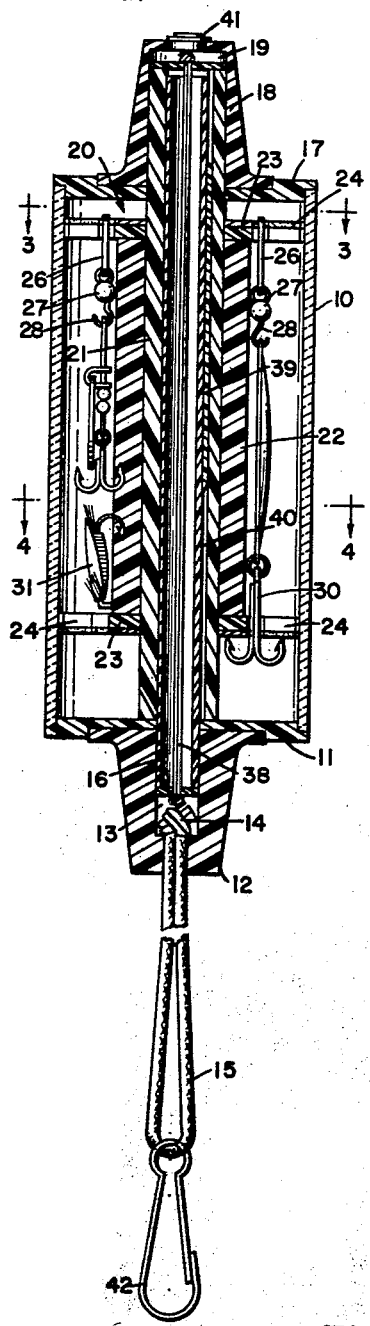
FIG. 1 is a vertical sectional view of a fish lure holder constructed in accordance with the present invention, showing some lures mounted on the lure-holder assembly to illustrate the application of the invention.

The lure-holder of this invention is somewhat similar to the fly holder of our co-pending application, referred to supra, comprising a cylindrical transparent casing or container 10, in which the lure-holder assembly is slidably mounted, after a fashion shortly to be described. One end of the receptacle is closed by a disc 11, and carries a finger knob 12, which is provided with a central recess 13. The recess, inter alia, is adapted for the reception of the knotted ends 14 of a supporting cable 15. The free ends of the cable are trained through an axial opening in the finger knob 12, prior to forming the knots. One end of a circular, tubular, guide 16 is anchored in the recess 13. The guide extends axially upwardly through the casing 10 and beyond the top of the latter through a closure 17 which is detachably mounted on the top of the container 10, as shown in FIG. 1. The closure includes a knob 18, which is axially recessed as indicated at 19, which recess is adapted for the reception of the upper end of the guide 16 as also illustrated in FIG. 1.

Figure 2:
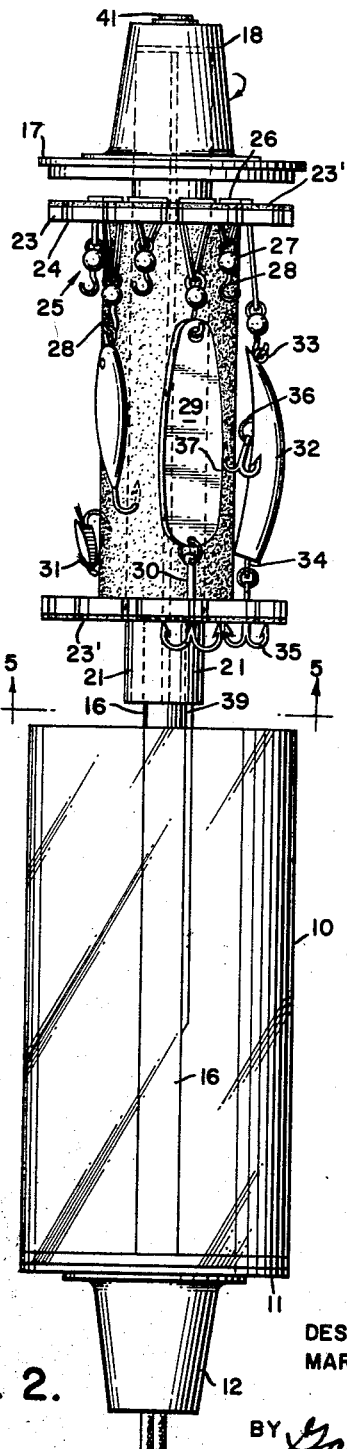
FIG. 2 is a side elevational view of the holder entity including the holder container and lure-holding assembly, the latter being illustrated in open position to demonstrate to advantage the manner in which the assembly may be held in open position to facilitate removal of lures from and attachment of lures to complemental parts in the assembly.
Figure 3:
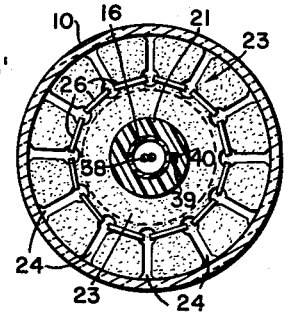
FIG. 3 is a cross-sectional view taken along the lines 3—3 of FIG. 1, looking in the direction of the arrows.
Figure 4:
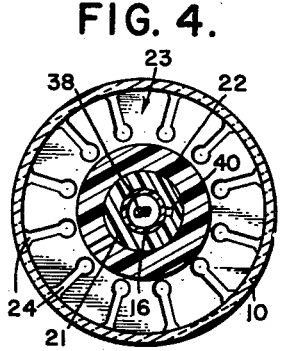
FIG. 4 is a cross-sectional view taken along the lines 4—4 of FIG. 1, looking in the direction of the arrows.
Figure 5:
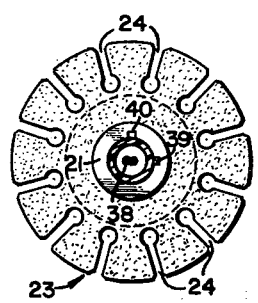
FIG. 5 is a cross-sectional view taken along the lines 5—5 of FIG. 2, looking in the direction of the arrows.

The closure 17 and its associated knob 18 carries the lure-holding assembly, generally designated 20. The assembly 20 embodies a core tube 21, a portion of the periphery of which is covered by material 22 receptive to hooks. A material which has been found to be satisfactory for use in this connection is ethafoam, which is of spongy consistency, and with which the hooks may be readily engaged and disengaged. The lure-holding assembly also includes stays 23 which are secured to the outer periphery of the core tube 21 at a point just above and below the hook-engaging material 22, as illustrated to advantage in both FIGS. 1 and 2. Each of the stays comprises a discal body with a plurality of radial slots 24, the closed ends of which are preferably arcuate, as shown in FIGS. 3, 4 and 5 for more effective securement of connectors 25. The upper stays are adapted to support yieldably mounted lure connectors 25.

Each of the connectors consists of a rubber band or like resilient member, 26, the sides of which extend through two adjacent slots 24 with a portion of the band pending below the stay and trained through an eye 27 formed on one end of a bead-carrying supporting shank 28, the other end of which is of hook-shape for engagement with a complemental part of a lure body. The lower stay 23 is adapted to anchor a fish hook carried by a lure, the shank of the fish hook being mounted in one of the slots 24. For instance, as shown to advantage in FIGS. 1 and 2, one end of one of the lure bodies designated 29 is suspended from one of the connectors 25. The opposite end of the lure body, which is equipped with a fish hook 30, is adapted to be engaged with the lower stay 23 as shown in FIGS. 1 and 2. This engagement is effected by pulling downwardly on the hook so as to place the rubber band on the connector 25 under tension. The shank of the hook 30 is then moved radially inwardly in one of the slots 24, until the prongs of the hook are engaged with a penetrable covering 23' on the bottom face of the lower stay, as advantageously illustrated in FIG. 1. The upper face of top stay 23 is provided with a like penetrable covering 23'. This permits the reverse engagement of the lures with the stays, if desired.

It is of course to be understood that there are a large variety of lures, such as flies 31, spoons, such as already designated at 29, dare devils, wobbles and spinners, which the present invention is adapted to hold. The Lazy Ike lure, here designated 32, is of simulated crescent shape, having an eye 33 mounted on its surface, near the upper end when supported in the holder of this invention. This eye is adapted to be engaged by one of the connectors 25. The lower contoured surface of the lure 32 also has an eye, indicated 34, which supports a fish hook 35. On the convex face of the lure, an eye 36 is mounted, approximately midway the ends of the lure and is adapted to carry a fish hook 37. When the Lazy Ike lure is suspended in the holder, the upper eye 33 is engaged by one of the connectors 25 and a prong or barb of one or more of the fish hooks 37 is embedded in the hook-engaging material 22 to secure the lure from lateral displacement. The hook 35 of the lure 32 is engaged with the lower stay in the same fashion as the hook 30 is engaged.

When a lure is to be engaged with, or disengaged from the assembly, the latter is withdrawn from the casing by upward axial pressure on the knob 18, to a point where the assembly clears the top of the container 10, as shown in FIG. 2. When pressure is released, the assembly is ordinarily withdrawn into a container, under the force of an elastic cable 38, one end of which is secured to the closed inner end of the guide 16, the other end being secured to the closed outer end of the core tube 21, as shown in FIG. 1.

Suitable means are included in the present invention in order to retain the lure-holding assembly 20 in its outer position as shown in FIG. 2. This means consists of a spline or longitudinal key 39 formed or secured to the outer periphery of the guide 16 and extending upwardly to a point slightly beyond the upper terminal of casing 10. A splineway or keyway 40 is formed in the core tube 21, adapted to receive spline 39. When it is desired to retain the lure-holding assembly in the position shown in FIG. 2, a rotative movement is imparted to either the casing or the lure-holding assembly to move the spline or key 39 to a locus out of alignment with the splineway (see FIG. 2). Spline 39 is thereby contacted at its upper terminal by the lower terminal of core tube 21, to retain the latter in extended position against the tension of elastic cable 38. The bottom of core tube 21 may be indexed or marked in any other suitable manner, at the locus of the splineway, if desired, to facilitate re-engagement of the spline with the splineway. The outer end of knob 18 is provided with an opening for access to elastic cable 38, the opening being normally closed by a cap 41.

In use of this invention, the lure-holder is preferably attached to the belt or an article of clothing worn by the fisherman. For convenience in attaching this to a belt, pocket, or the like, a snap fastener 42 is engaged with the supporting cable 15. When engaged to apparel of the fisherman, the housing pends downwardly in a direction opposite to that shown in FIG. 1. When it is desired to gain access to the lures in the lure-holder assembly, the holder is grasped in one hand by the fisherman and swung upwardly to the position shown in FIGS. 1 and 2, to permit knob 18 to be drawn upwardly with the other hand of the fisherman, against the tension of the elastic cable 38, until the spline is disengaged from the splineway. A slight rotational movement of knob 18 and lure-holding assembly 20 effects engagement of the spline key with the terminal of the core tube 21 to maintain the lure-holding assembly in position for access to the lures.

While we have herein shown and described a preferred embodiment of our invention, it is nevertheless to be understood that various changes may be made therein, without departing from the scope of the appended claims.

What is claimed is:

1. A holder for fish lures having fish hooks, including a cylindrical casing, a closure at one end of said casing, a tubular guide fixed to said closure and extending axially through said cylindrical casing to a point beyond the terminal thereof, a spline fixed to the outer periphery of said guide and extending longitudinally through a substantial portion of the guide's length, a second closure detachably mounted on the open end of said casing and adapted to receive the free end of said guide, a lure-holding assembly fixed to said detachable second closure and adapted for reception by said casing, said assembly including a core tube adapted for engagement over said guide, the core tube having an internal longitudinal splineway adapted to receive the spline of said guide, material engaged with the outer periphery of said core tube throughout a substantial portion of the latter's length and adapted to receive and support hooks engaged therewith, disk-shaped stays having radial slots mounted above and below said material, an elastic member engageable at intervals in the slots of one of the disks, a hook element carried by said elastic member for attachment to an eye of a fish lure at one end, the shanks of the fish hooks being engageable in the slots of the other disk, to securely hold the lures in position, and elastic means for normally retaining said lure-holding assembly within said casing.

2. The holder of claim 1 wherein said spline extends to a point slightly beyond the terminal of said casing, the casing and lure-holding assembly being relatively rotataed after the assembly clears the spline of said tubular guide, to permit engagement of a terminal of said core tube with a terminal of said spline when the assembly is withdrawn from the casing against the tension of said elastic means, to retain the assembly in position for access to lures.

3. A holder for fish lures including a casing equipped with an axial guide, a lure supporting assembly in the casing having a tubular member slidably mounted on said axial guide, a spline on said axial guide for a substantial part of the latter's length and extending to a point beyond one terminal of said casing, said spline being adapted to be received in a complemental spline-way in the tubular member of said support assembly, the spline being shorter than the splineway to permit said casing and assembly to be relatively rotated, when the splineway clears the spline to permit one end of the spline to engage a terminal of a lure-supporting assembly to hold the latter in position for access to the lures, and tensioning means connecting said casing and lure-supporting assembly for normally urging the latter into the former.

4. The holder of claim 3 wherein said tensioning means is an elastic member.

5. The holder for fish lures of claim 3, wherein said lure-supporting assembly includes material engaged with the outer periphery of said tubular member throughout a substantial portion of the latter's length and is adapted to receive and support hooks engaged therewith, disk-shaped stays having radial slots mounted above and below said material, an elastic member engageable at intervals in the slots of one of the stays, a hook element carried by said elastic member for attachment to an eye of a fish lure at one end, the shanks of the fish hooks being engageable in the slots of the other stay, to securely hold the lures in position, and said tensioning means comprising elastic means for normally retaining said lure-holding assembly within said casing.

6. A holder for fish lures having fish hooks, including a cylindrical casing, a closure at one end of said casing, a tubular guide fixed to said closure and extending axially through said cylindrical casing to a point beyond the terminal thereof, a second closure detachably mounted on the open end of said casing and adapted to receive the free end of said guide, a lure-holding assembly fixed to said detachable second closure and adapted for reception by said casing, said assembly including a core tube adapted for engagement over said guide, material engaged with the outer periphery of said core tube throughout a substantial portion of the latter's length and adapted to receive and support hooks engaged therewith, disk-shaped stays having radial slots mounted above and below said material, an elastic member engageable at intervals in the slots of one of said stays, a hook element carried by said elastic member for attachment to an eye of a fish lure at one end, the shanks of the fish hooks being engageable in the slots of the other of said stays, with the barbs of the hooks being held against the outer face of said other stay, under urging of said elastic member, to securely hold the lures in position, and elastic means for normally retaining said lure-holding assembly within said casing.

References Cited by the Examiner

UNITED STATES PATENTS

| | | | |
|---|---|---|---|
| 742,040 | 10/03 | Kurtz | 43—57.5 |
| 1,492,270 | 4/24 | Silverman. | |
| 2,658,300 | 11/53 | Snyder | 43—57.5 |
| 2,670,563 | 3/54 | Anderson | 43—57.5 |
| 2,693,662 | 11/54 | Norton et al. | 43—57.5 |
| 2,760,296 | 8/56 | Faul | 43—57.5 |
| 2,830,399 | 4/58 | Davis | 43—57.5 X |

ABRAHAM G. STONE, *Primary Examiner.*